United States Patent [19]

Lutz

[11] Patent Number: 5,332,186

[45] Date of Patent: Jul. 26, 1994

[54] COMBINED ADJUSTABLE OUTSIDE MIRROR WITH SWING LOCK MECHANISM

[75] Inventor: Russell Lutz, Warrington, Pa.

[73] Assignee: Delbar Products, Inc., Perkasie, Pa.

[21] Appl. No.: 977,095

[22] Filed: Nov. 16, 1992

[51] Int. Cl.⁵ .......................................... F16M 13/00
[52] U.S. Cl. .................................. 248/549; 248/479
[58] Field of Search ............... 248/549, 900, 289.1, 248/479, 477, 478; 359/841, 872, 874, 876

[56] References Cited

U.S. PATENT DOCUMENTS

| | | | |
|---|---|---|---|
| 3,119,591 | 1/1964 | Malecki | 248/282 |
| 3,322,388 | 5/1967 | Budreck | 248/289.1 |
| 3,384,334 | 5/1968 | Malachowski | 248/289.1 X |
| 3,637,186 | 1/1972 | Greenfield | 248/289.1 X |
| 3,642,245 | 2/1972 | Wohnlich | 248/289.1 X |
| 3,730,474 | 5/1973 | Bowers | 248/478 |
| 4,186,905 | 2/1980 | Brudy | 248/289.1 X |
| 4,523,735 | 6/1985 | Beck et al. | 248/476 |
| 4,789,232 | 12/1988 | Urbanek | 359/872 X |

FOREIGN PATENT DOCUMENTS 0079677  5/1983  European Pat. Off. ............ 248/479

Primary Examiner—Karen J. Chotkowski
Attorney, Agent, or Firm—Reising, Ethington, Barnard, Perry & Milton

[57] ABSTRACT

A mirror swing lock mechanism comprises an arm mounted at one end to the outside surface of a vehicle and a mirror heat assembly. The head assembly includes a first planar surface supported on a second planar surface associated with said arms coacting detent elements are formed in said planar surfaces for locating said mirror head assembly in either a first laterally extended rear viewing position or a second non rearward viewing position generally folded against the vehicle surface.

8 Claims, 3 Drawing Sheets

COMBINED ADJUSTABLE OUTSIDE MIRROR WITH SWING LOCK MECHANISM

TECHNICAL FIELD

The present invention relates to a system for mounting an outside vehicle rear viewing mirror upon the exterior surface of vehicle and, more specifically, a mounting mechanism which allows the mirror head and its support mechanism to be swung from its normal rearward viewing position to prevent damage to the mirror head under various adverse operating conditions.

BACKGROUND ART

Mirror mechanisms of the type to which the subject invention generally relates are shown in U.S. Pat. No. 4,523,735 Beck et al.; U.S. Pat. No. 3,730,474 Bowers; and U.S. Pat. No. 3,119,591 Malecki all of which inventions are assigned to the assignee of the present invention. The mirror mounting mechanisms of the type to which the aforenoted patents as well as the subject invention relate have come to be termed "Mirror Swing Lock Mechanisms" which generally is intended to describe a mirror mounting mechanism wherein the mirror is normally positioned in a laterally extended position from the vehicle body for normal rear viewing but which mechanism also permits the mirror head support structure to be swung about a pivot axis to a position in which the mirror and its mounting mechanism are generally foldable against the side of the vehicle to prevent the mirror head from being damaged. Such swing lock mechanisms include detent devices which locate the mirror head assembly either in its normally laterally extended position for rearward viewing through the mirror or in its folded back non-viewing position.

In the past, such swing lock mechanisms have been used with larger mirrors of the type used on various types of trucks or heavy vehicles. Such truck mirrors are particularly susceptible to damage since they normally are mounted so as to extend laterally a considerable distance from the vehicle to permit adequate rear view sighting. Such truck mirrors have been subject to being damaged by striking an object either during normal operation of the vehicle or when the vehicle itself is being transported. In either case, it is desirable that the mirror support mechanism fold back against the vehicle side surface under conditions where it either strikes an object or to prevent it from otherwise being damaged during transportation in the vehicle itself. However, such mirror head foldback or swing lock mechanisms are now finding increasing usage with normal vehicles or cars with the same general purpose of preventing damage to the mirror head under conditions likely to cause damage to the head. In any event, the subject invention is not limited to the size of vehicle to which the mirror head is mounted and may be used equally with large and small vehicles.

Particularly as the swing lock for fold back feature becomes more applicable to passenger cars and other small vehicles, prior type mirror swing lock mechanisms have become less than completely satisfactory for numerous reasons. First, there is the ever present demand for less complicated and, therefore, less costly mechanisms. Thus it is applicant's first objective to greatly simplify the swing lock mechanism of the present invention. This inevitably means fewer operating parts and careful selection of coacting swing lock part and, particularly, detent materials. Finally, the swing lock mechanism must function in a way to absolutely minimize vibration of the mirror head when the mirror head is in its laterally outwardly extended position in order to assure a sharp image being viewed in the mirror. It is particularly in this latter respect that the subject invention relates to a substantial improvement over earlier mechanisms.

Another aspect which has become ever increasingly important in realizing an improved swing lock mechanism is attention that environmental matters play in the manufacture of such assembly. In the present device the swing lock mechanism is constructed in a way to eliminate metal to metal contact but also metal to plastic contact and thus eliminates plating or painting requirements in the mechanism. Also eliminated is the need to heat treat previously used metal parts. Basically, the swing lock mechanism involves the coaction between judiciously selected plastic components.

DISCLOSURE OF THE INVENTION

In summary of the invention, the present invention includes the following new and improved features not shown in the prior art:

1. Both the male and female detent parts of the swing lock mechanism are fabricated from complementary plastic components.

2. Male and female detents are incorporated into the mirror head or mirror head support arm assemblies in such a way as to reduce the number of parts necessary to be used.

3. The shape, size and angular relationships between the coacting male and female detent surfaces have been found to be critical and, particularly have been designed in a way to create and maximize flat, as opposed to previously rounded, bearing surfaces between the coacting male and female swing lock members and, thereby, greatly reducing a tendency of the mirror head to vibrate when in its laterally extended position.

The mirror swing lock mechanism of the subject invention comprises a support arm adapted to be fixed at one end to the exterior surface of a vehicle and which arm generally extends a short distance laterally from the vehicle and, in turn, supports thereupon a mirror head assembly. The mirror head assembly and support arm are connected along a pivot axis laterally offset from the side of the vehicle in order that the mirror head may be swung about such pivot axis to move the mirror head to a non-laterally projecting or non-viewing position. In its normal rearward viewing position the mirror head extends laterally from the vehicle surface and the mirror head is predominantly outboard of the pivot axis.

The mirror head assembly is formed of a suitable plastic, while the mirror head assembly support arm may either be formed of plastic or metal. However, the incorporated detent mechanism assembly, including male and female members are formed of plastic so that there is no metal to metal or metal to plastic contact in the swing lock mechanism.

One of the imperative improved features required of a swing lock mechanism of the type with which we are concerned, is the need to reduce the likelihood of mirror head vibration when the mirror head assembly is in its laterally, fully extended and rear viewing position. This situation has been improved by creating flat bearing surface areas of contact to support the mirror head assembly up the support arm and into which surfaces male and female detent elements are integrally molded. As will be described, the detent elements are areably small relative to said bearing surfaces and function primarily to locate the mirror head assembly in either its rear viewing or non-rear viewing positions while the flat surfaces provide the primary bearing support of the mirror head assembly upon the support arm. Thus, the male and female detent members locate the mirror head assembly relative to the support arm but do not provide the primary rotational or pivoting support for the mirror head assembly, rather, they ensure that the flat bearing surfaces surrounding the male and female elements provides such primary support. This is a significant departure from prior art designs.

The details of the invention are set forth in the drawings and the detailed description which follows.

BRIEF DESCRIPTION OF THE DRAWINGS

Reference is now made to the drawings and the following description wherein the invention is described in detail.

BEST MODE FOR CARRYING OUT THE INVENTION

Figure 1:
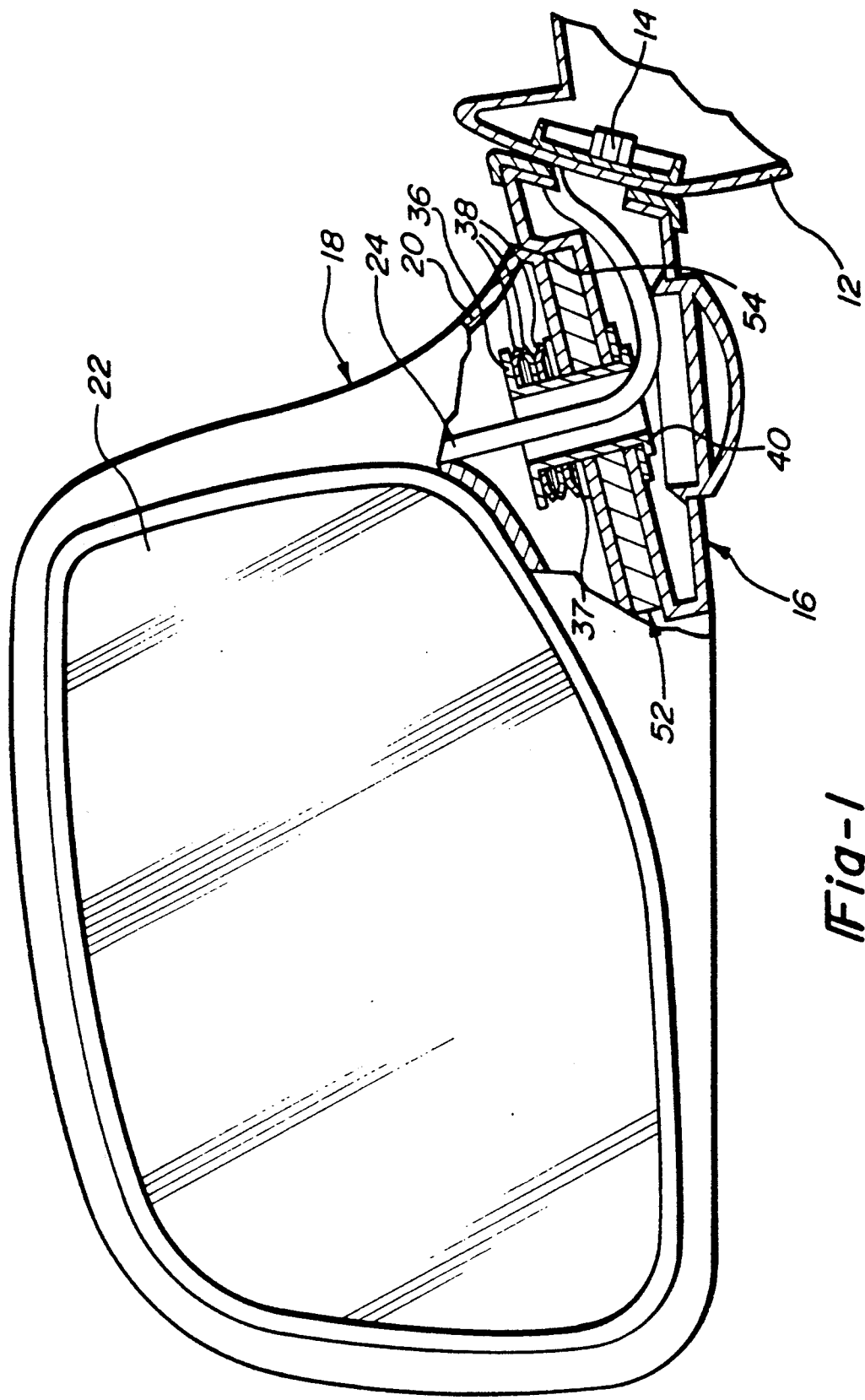
FIG. 1 is a partially sectioned elevational view of a mirror support mechanism embodying applicant's new and improved swing lock mechanism.

Referring to FIG. 1, a vehicle outside normally rear-viewing mirror assembly is indicated generally at 10 and is mounted upon an exterior vehicle surface 12 through suitable fastening means 14. More specifically, the mirror assembly includes an arm 16 fixed at its inner end to vehicle surface 12. Arm 16 extends laterally from the vehicle surface 12 and supports a mirror head subassembly 18 thereupon.

Mirror head subassembly 18 includes a hollow casing 20 within which mirror 22 is adjustably mounted. Incidentally, as shown, the mirror 22 is remotely controlled from within the vehicle through a suitable adjusting mechanism 24 which forms no part of the present invention.

The mirror head casing 20 is of a suitably molded plastic material the selection of which is carefully matched for proper performance with other coacting elements of the mirror assembly. A most satisfactory casing material is found to be Acrylate Styrene Acrylonitrile (ASA) manufactured by G.E. or BASF.

Figure 2:
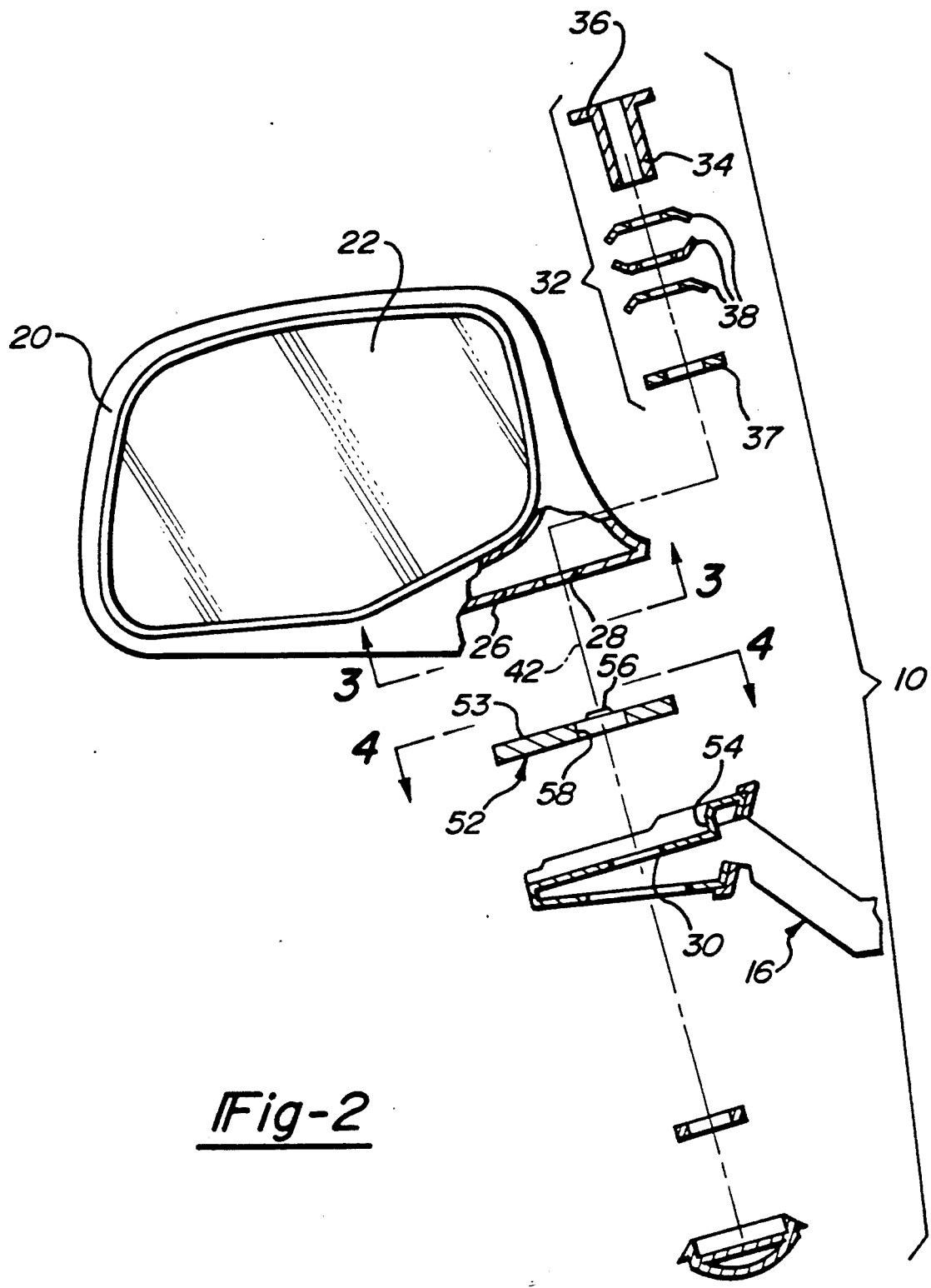
FIG. 2 is an exploded and partially sectioned view showing the components of the assembly.
Figure 3:
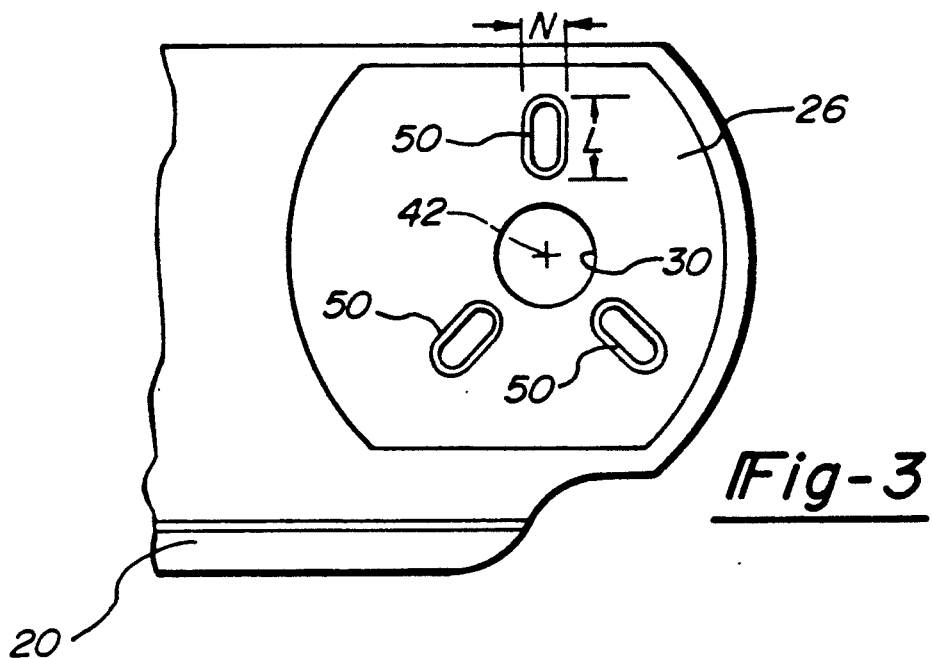
FIG. 3 is a view along line 3—3 of FIG. 2 showing the female detent elements integrally formed in a planar surface of the mirror casing.

As best seen in FIGS. 2 and 3, the mirror head casing 20 includes a flat or planar base portion 26 having a central opening 28 extending therethrough and adapted to coaxially align with a similar opening 30 formed through arm 16. A frictionally adjustable stud assembly is indicated generally at 32. The stud assembly includes a hollow stud element or pin 34 with an upper rim or lip 36 between which and a washer 37 spring elements such as belleville washers 38 are contained. Stud element 34 projects through base 28 male detent 58 and arm opening 30 with the stud assembly being adjustably held together by a suitable end flange 40 or suitable threaded nut arrangement and which springs maintain a load of between 200–300 pounds on the detent elements and mating planar surfaces. The tension on spring elements 38 is preset to provide the proper axial loading on the subsequently to be described detent mechanism and flat bearing surfaces and which enables the mirror casing to be rotatable relative to arm 16. Incidentally, it is to be noted that the axis of rotation 42 is proximate the inner end of the mirror casing whereby under emergency situations the casing can rotate from its normal outward and rear viewing position to a position parallel to the vehicle surface.

DETENT MECHANISM

As noted, it is critical to such swing mirror devices that they be as vibration free as possible when the mirror is in its normal rear viewing position. It is the improvement in mirror head mounting against vibration that this invention is particularly directed.

The design criteria in which the present invention is intended to operate and which has not been heretofore achievable with a greatly simplified design is generally as follows. To maintain an axial or loading force between the coacting detent elements of between 10 to 32 pounds throughout 3500 mirror head folding cycles when measured 9 inches out from the axis of mirror head rotation 42. The maximum play in the detent mechanism is not to exceed 0.160 inches when a 5 pound force is applied from the axis of rotation 42. The present invention has met or exceeded this design criteria through 10,000 cycles.

In the prior art swing lock devices, including those of applicant and its assignee, the coacting detent elements have been required to provide the primary, if not sole, resistance or bearing load to hold the mirror head against vibration. Through applicant's present invention this bearing load has been primarily taken off the coacting detent elements and transferred to relatively large planar bearing surfaces far better to withstand vibration.

Mirror head base portion 26 provides the first such bearing surface. As best seen in FIG. 3, female detent elements 50 are integrally molded into base portion 26. Elements 50 are radially arrayed about rotation axis 42. Note that the total size or cross sectional area of the elements 50 is small as compared with the remaining flat or planar area of base portion 26.

Figure 5:
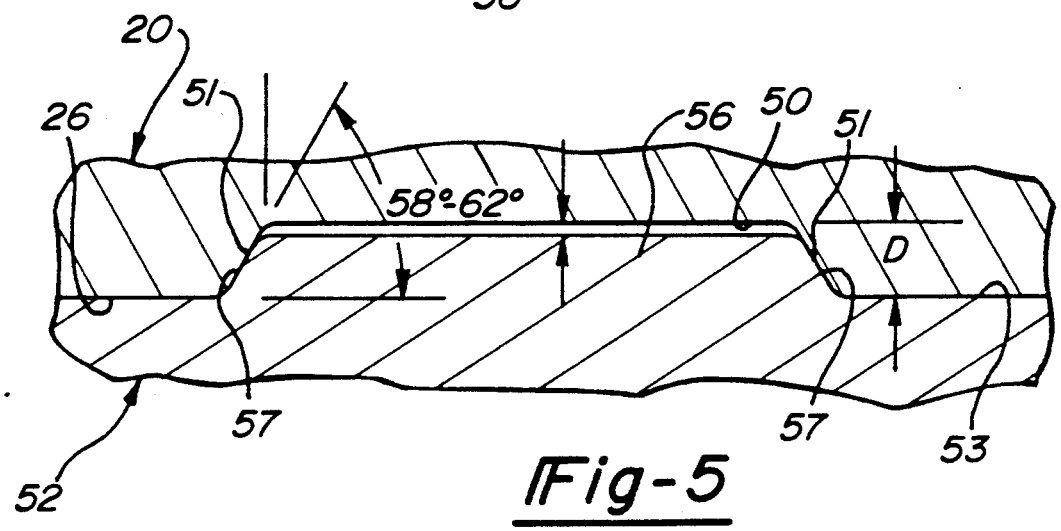
FIG. 5 is an enlarged sectional view through the detent element.

It is preferred that the length L of elements 50 is generally twice that of their width W. While dimensions may vary their relationship are important. By way of example, the footprint of mirror head base portion 26 can be approximately 3 inches by 3 inches. Again by way of example, the length of each element 50 is approximately 0.687 inches while its width is approximately one-half such length. As seen in FIG. 5 the depth of elements 50 is approximately 0.040 inches. The side walls 51 of elements 50 are angled substantially more steeply than in previous detent designs, particularly see U.S. Pat. No. 4,523,735. Specifically, it is preferred that such angle be in the range of 58°–62° from the horizontal bearing surface portion 26. In the detents of U.S. Pat. No. 4,523,735 the comparable angle is 30°. Such relatively steep angle to the bearing surface assures that the coacting detent elements will snap together for very positive angular location between the mirror head assembly and the support arm.

Reference is now made to a male detent member 52 adapted to seat within a recess 54 formed in arm 16. Again by way of example, the footprint of member 54 can be approximately 2.750 inches by 2.750 inches and most of which area constitutes the second planar bearing surface 53. Raised male detent elements 56, except as noted, have the same general dimensional and angular relationships as the female detents 50 and are similarly arrayed about central opening 58 through which stud 34 also extends. As best seen in FIG. 5, it is critical that there is a gap or space 57 between the top and bottom walls of detent elements 50 and 56 in order that the bearing surfaces 26 and 53 touch to provide the major load bearing of the mechanism. Thus, the rocking of the mirror head is eliminated as compared to prior art devices in which the rotational bearing load has been sustained by the detent elements alone. Incidentally, the aforementioned gap can be in the range of 0.005 inches to 0.010 inches.

Male detent members 56 include angled side walls 57 coacting with the side walls 51 of female detents 50.

Figure 4:
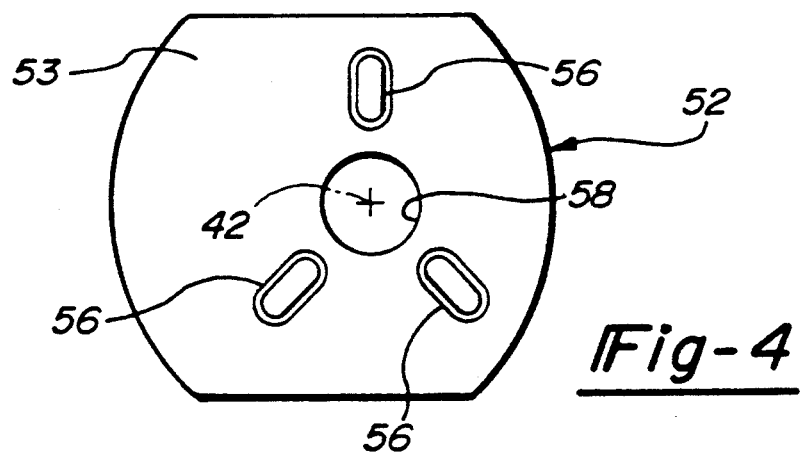
FIG. 4 is a view along line 4—4 of FIG. 2 showing the male detent elements as integrally molded into a detent mechanism insert member.

The male detent member 52 is formed of a non-foamed or non-cellular thermoplastic polyurethane made by the B. F. Goodrich company and sold under the tradename ESTANE. In the form used, this material has a 70 durometer D scale±3 D and thus is resiliently deformable and compressible as it coacts with the detent elements 50. Again as best seen in FIGS. 4 and 5, the male detent elements are integrally molded into the major bearing surface 53 of member 52.

It is obvious that the female and male detent elements can be formed in either of the planar surfaces 26 or 53 as long as the noted relationships are maintained.

Other modifications of the subject invention may be made within the intended scope of the hereinafter appended claims.

What is claimed is:

1. A mirror swing lock mechanism of the type comprising an arm (16) adapted to be mounted at one end to the exterior surface (12) of a vehicle, said arm projecting from said vehicle surface and laterally spaced therefrom; a mirror head assembly (18); means (32) having an axis (42) for pivotally supporting the mirror head assembly upon the arm whereby the assembly may be rotated between a first non-rearward viewing position proximate said vehicle surface and a second rearward viewing position laterally spaced outwardly of the vehicle surface; and a detent mechanism for retaining said mirror head assembly in either of said positions; the improvement including:

(a) said mirror head assembly having a planar base portion (26);
(b) a first set of detent elements (50) integrally formed in said planar base portion and radially spaced about the axis (42) of the pivotal support means;
(c) a recess (54) formed in said arm;
(d) a deformable and compressible member (52) disposed in said recess and including a planar surface (53) adapted to be abuttingly disposed opposite the planar base portion (26) of the mirror head assembly and having a second set of detent elements (56) of complementary shapes and sizes to said first set of detent elements, said first and second detent elements coacting to locate the mirror head between its first and second positions;
(e) the means (32) for pivotally supporting the mirror head assembly extending through both the head assembly planar base portion (26) and the planar surface (53) of the deformable member;
(f) the pivotal support means (32) including spring means (38) biasing said head assembly base portion (26) against the planar surface (53) of the deformable member to provide the primary load bearing surfaces as the mirror head assembly is rotated between the first and second positions.

2. A mirror swing lock mechanism as set forth in claim 1 in which each of the detent elements is of elongated shape with the length being generally radial relative to said axis of rotation and having a width generally one half the dimension of said length.

3. A mirror swing lock mechanism as set forth in claim 1 wherein the first and second detent elements are of complementary male and female shapes and are adapted to nest within one and other when the mirror head is in either its first or second position, said detent elements being spaced from each other in a direction generally perpendicular to the planar surfaces (26,53) of the mirror head assembly and the deformable and compressible member when the elements are fully nested within each other whereby the planar base portion (26) of the mirror head assembly and the planar surface (53) of the deformable member abuttingly engage to provide the predominant bearing support surfaces between the mirror head assembly and the arm.

4. A mirror swing lock mechanism as set forth in claim 3 wherein each detent element includes a pair of inclined surfaces (51, 57), with the angle of each inclined surface being in the range of 58° to 62° to the planar base portion (26) of the mirror head assembly.

5. A mirror swing lock mechanism of the type comprising an arm (16) adapted to be mounted at one end to the exterior surface (12) of a vehicle, said arm projecting from said vehicle surface and laterally spaced therefrom; a mirror head assembly (18); means (32) having an axis (42) for pivotally supporting the mirror head assembly upon the arm whereby assembly may be rotated between a first non-rearward viewing position proximate said vehicle surface and a second rearward viewing position laterally spaced outwardly of the vehicle surface; and a detent mechanism for retaining said mirror head assembly in either of said positions; the improvement including:

(a) said mirror head assembly being formed of a plastic material and having a planar base portion (26);
(b) a first set of detent elements (50) integrally formed in said planar base portion (26) and radially spaced about the axis of the pivotal support means;
(c) a recess (54) formed in said arm;
(d) a deformable and compressible member (52) formed of a non-cellular plastic material and disposed in said recess and including a planar surface (53) and having a second set of detent elements (56) of complementary shapes and sizes to said first set of detent elements, said first and second detent elements coacting to locate the mirror head between its first and second positions;
(e) the means (32) for pivotally supporting the mirror head assembly extending through both the head assembly planar base portion (260 and the planar surface (53) of the deformable member and including spring means (38) for resiliently biasing said planar surface (53) and said planar base portion (26) against each other to provide the primary load bearing surfaces as the mirror head assembly is rotated upon the arm between the first and second position.

6. A mirror swing lock mechanism as set forth in claim 5 wherein the first and second detent elements are of complementary male and female shapes and are adapted to nest within one and other when the mirror head is in either its first or second position, said detent elements being spaced from each other in a direction generally perpendicular to the planar surfaces (26, 53) of the mirror head assembly and the deformable and compressible member when the elements are fully nested within each other whereby the planar base portion (26) of the mirror head assembly and the planar surfaces (53) of the deformable member abuttingly engage to provide the predominant rotational bearing support surfaces between the mirror head assembly and the arm.

7. A mirror swing lock mechanism as set forth in claim 6 wherein each detent element includes a pair of outwardly flared inclined surfaces (51, 57), with the angle of each inclined surface being in the range of 58° to 62° to the planar base portion (26) of the mirror head assembly to enable the coacting detent elements to locate the mirror head assembly in either of its two positions.

8. A mirror swing lock mechanism as set forth in claim 7 in which each of the detent elements is of elongated shape with the length being generally radial relative to said axis of rotation and having a width generally one half the dimension of said length.

* * * * *